United States Patent [19]

Kubodera et al.

[11] Patent Number: 5,052,117
[45] Date of Patent: Oct. 1, 1991

[54] APPARATUS FOR MEASURING GEAR

[75] Inventors: Keizou Kubodera; Toshiaki Takeda; Hiroyuki Aoki, all of Ibaragi, Japan

[73] Assignee: Hitachi Construction Machinery Co., Ltd., Tokyo, Japan

[21] Appl. No.: 513,093

[22] Filed: Apr. 19, 1990

[30] Foreign Application Priority Data

Apr. 24, 1989 [JP] Japan .................. 1-104220

[51] Int. Cl.⁵ .................................. G01M 13/02
[52] U.S. Cl. .................. 33/501.9; 33/501.14; 73/162
[58] Field of Search .............. 73/162; 33/501.8, 501.9, 33/501.12, 501.14, 501.15, 501.7; 364/560, 561, 562, 563

[56] References Cited

U.S. PATENT DOCUMENTS

| 3,757,425 | 9/1973 | Bouillon et al. | 33/501.9 |
| 3,945,126 | 3/1976 | Bloch | 33/501.9 |
| 4,276,699 | 7/1981 | Sterki et al. | 33/501.9 |
| 4,325,189 | 4/1982 | Fransson et al. | 73/162 |
| 4,457,074 | 7/1984 | Golder | 33/501.9 |
| 4,852,402 | 8/1989 | Bertz | 73/162 |

FOREIGN PATENT DOCUMENTS

| 0249522 | 9/1987 | Denmark | 33/501.7 |
| 0273675 | 11/1989 | Denmark | 33/501.15 |
| 0346805 | 1/1922 | Fed. Rep. of Germany | 33/501.15 |
| 2747863 | 5/1987 | Fed. Rep. of Germany | 33/501.7 |

Primary Examiner—Thomas B. Will
Attorney, Agent, or Firm—Thomas R. Morrison

[57] ABSTRACT

A gear measuring apparatus comprises detecting device for outputting detection signals, an X-direction linear travel system for making the detecting device travel linearly in an X direction perpendicular to a radial line and rotation device for rotating the detecting device by causing the X-direction linear travel system to rotate around the rotation center of the gear. The gear measuring apparatus further comprises control device for interlocking the rotation and the X-direction linear travel of the detecting device so that a probe draws the standard involute tooth form, because the detecting device, which are set to an initial position, are rotated at only an extremely small angle $\theta$ by the rotation device, and at the same time the detecting device are made to travel linearly by $\theta \cdot (Dp \cdot \cos\alpha) \cdot \frac{1}{2}$ with the aid of the X direction liner travel system in the X direction, and recording device for recording the measured results based on detection signals from the detecting device. In addition, Dp is a pitch diameter and $\alpha$ is a pressure angle of the gear to be measured.

17 Claims, 9 Drawing Sheets

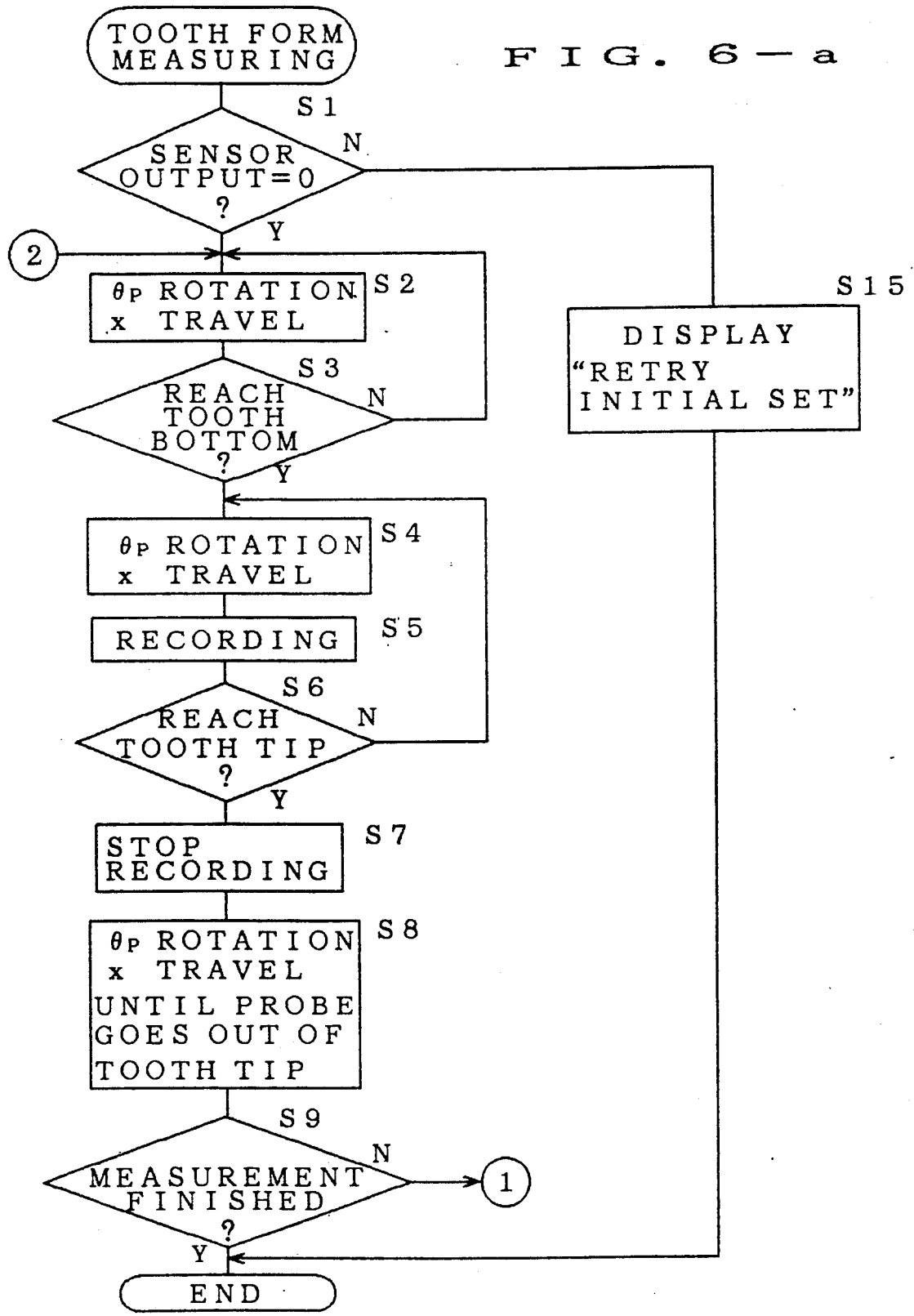
FIG. 6-a

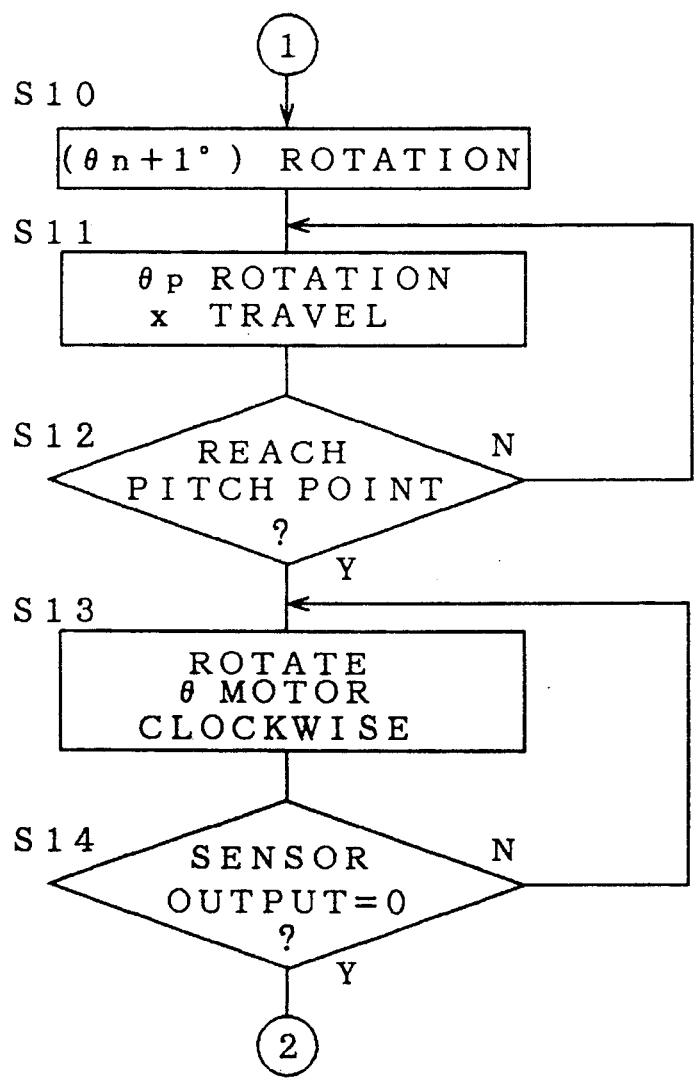
FIG. 6-b

FIG. 7-a
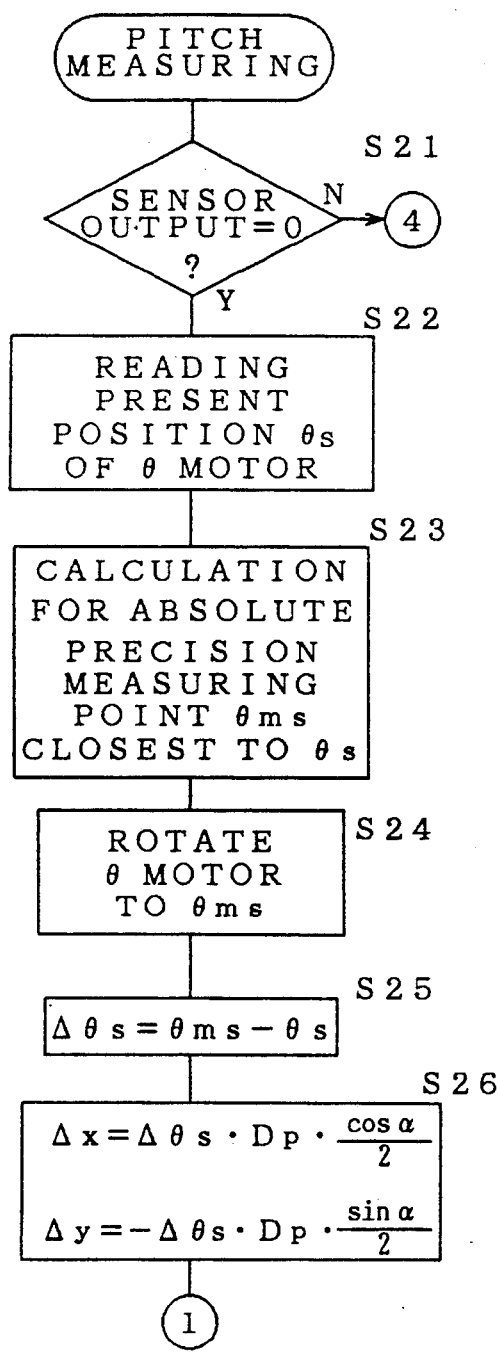
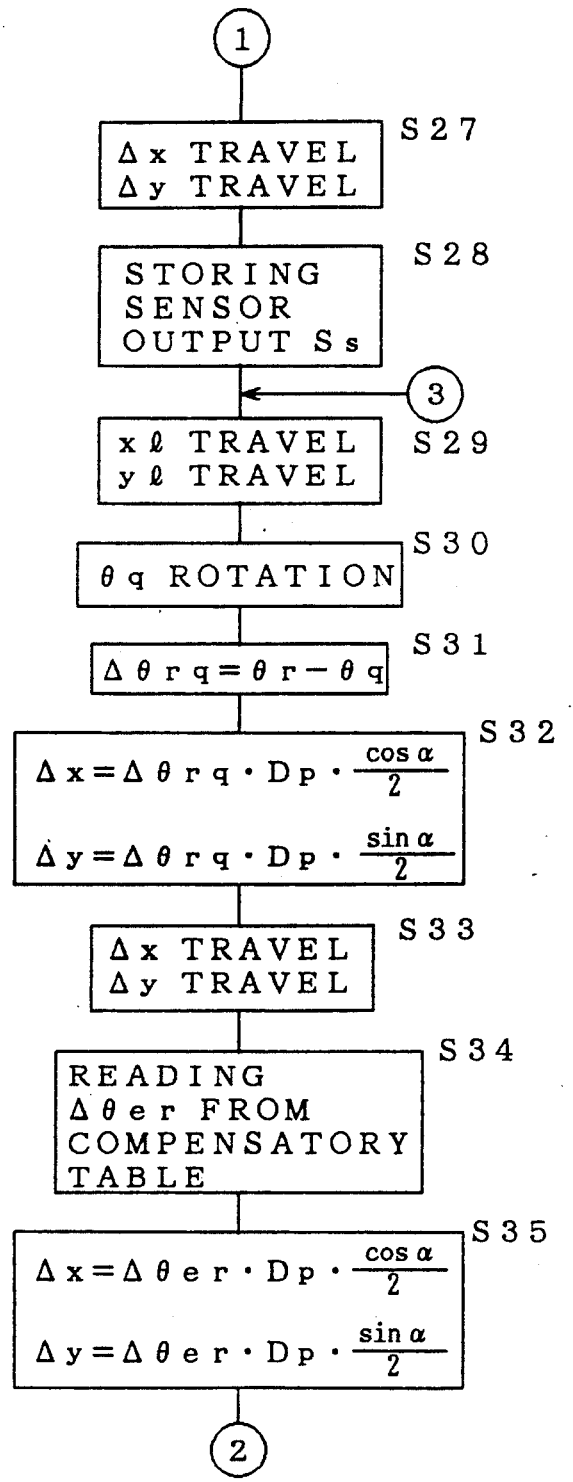

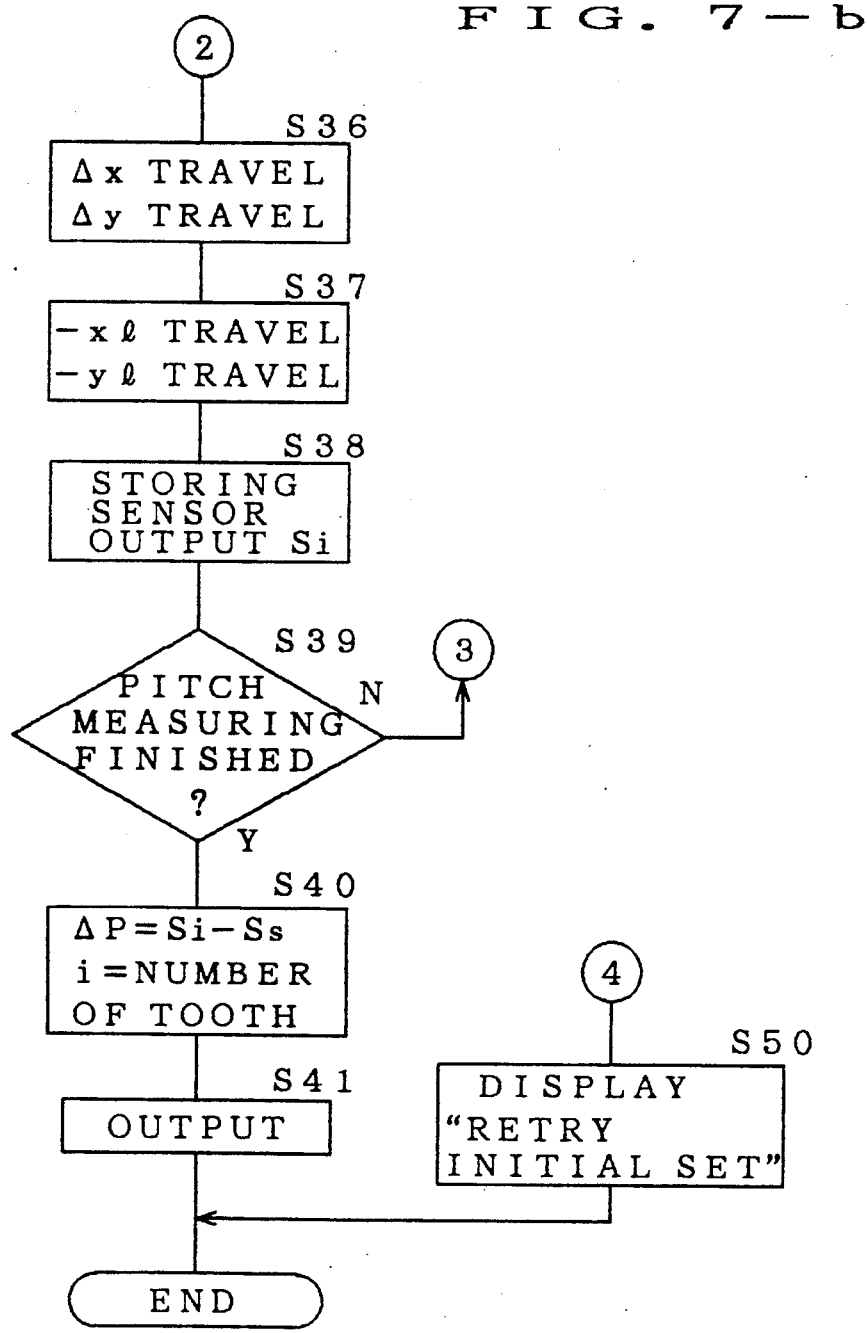

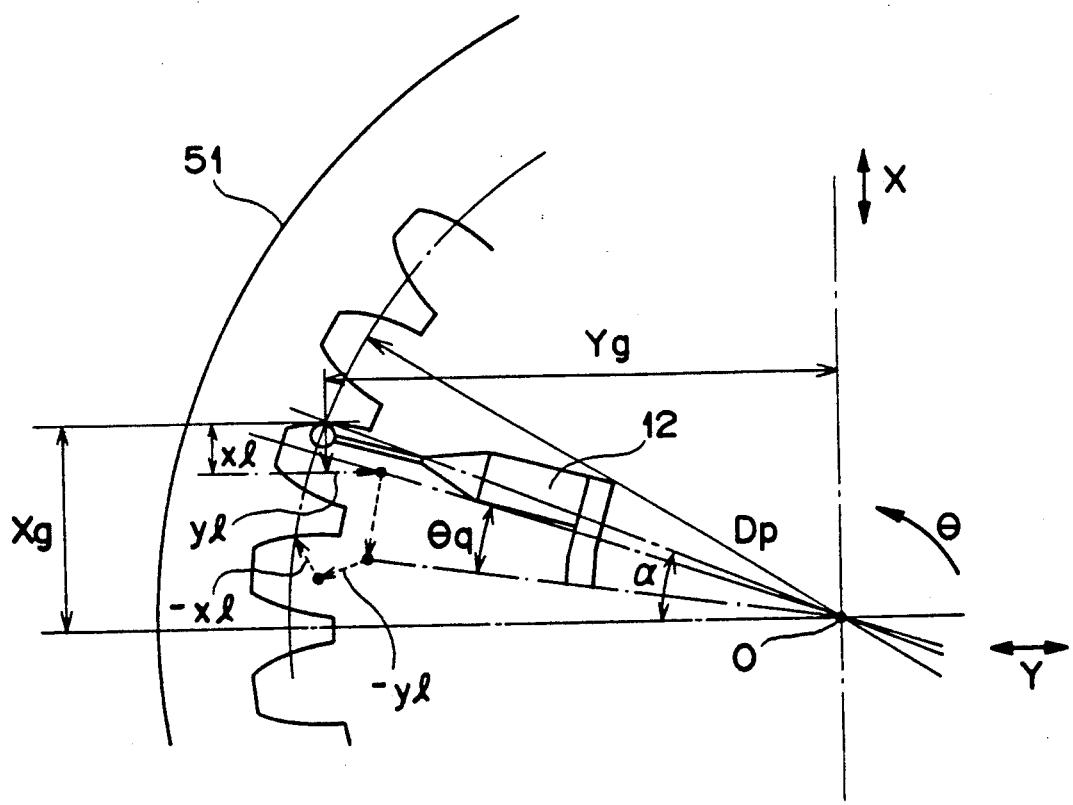

APPARATUS FOR MEASURING GEAR

BACKGROUND OF THE INVENTION

1. FIELD OF THE INVENTION

This invention relates to an apparatus for measuring gears (hereinafter referred to as a gear measuring apparatus), and particularly for measuring the tooth form of large-diameter spur ring gears or helical ring gears and for detecting pitch of the gear.

2. DESCRIPTION OF THE RELATED ART

For example, a conventional gear measuring apparatus disclosed in Japanese Patent Examined Publication No. 58-7923 measures the tooth form of a gear in the following way.

With the gear supported at its upper and lower center, the rotation of the lower center with the aid of a main shaft by a worm wheel speed reducer causes the gear to rotate. A probe is attached to the tooth surface of the gear and is made to travel linearly while the gear is rotated. At this stage, the deviation between the actual tooth form and the standard involute tooth form is determined from the angle of rotation of the gear and the linear distance traveled by the probe.

An apparatus similar to the above-mentioned apparatus is capable of detecting pitch of the gear as follows:

The probe is brought into contact with a pitch point and this point is designated the zero point. The probe is withdrawn to a fixed position and the gear is rotated by only one tooth. The probe in the fixed position is moved to a measuring position to bring the probe into contact with the pitch point. The probe reading at this time indicates a pitch error. The above-described operation is sequentially performed for each tooth and pitch errors are thereby obtained. The pitch errors obtained in this manner are errors accumulated from the zero point.

In such a conventional gear measuring apparatus, however, the gear must be supported by the apparatus for measuring. As a result, the supporting structure must be large and so must the apparatus when large gears such as those of one to two m dia. are measured, thereby leading to an expensive apparatus.

SUMMARY OF THE INVENTION

It is an object of the present invention to provide a gear measuring apparatus, which permits measuring the tooth form and detecting pitch of large gears, this apparatus being a small apparatus.

The principle of measuring the tooth form according to the present invention will now be described with reference to FIG. 5.

As shown in FIG. 5, numeral 51 indicates an internal gear to be measured, while numeral 12 indicates a displacement sensor which rotates around the rotation center 0 and travels linearly along the X axis.

Dimensions of the internal gear to be measured are as follows:

Module: M
Number of tooth: N
Pressure angle: $\alpha$
Pitch diameter: $Dp$ ($=M \cdot N$)
Basic circle diameter: $Dg(Dp \cdot \cos\alpha)$ A probe 12a of the displacement sensor 12 is initially set to X coordinates $Xg = (Dp \cdot \sin\alpha)/2$ and Y coordinates $Yg = (Dp \cdot \cos\alpha)/2$, which are used as initial values for measuring the gear. The probe 12a is brought into contact with a pitch circle of the tooth surface and the output of the displacement sensor 12 at this moment is set to zero. The pressure angle $\alpha$ is formed between a tangent running along the pitch point of the internal gear 51 and the Y axis (radius line). Under these conditions, the measuring of the gear is started.

For example, as shown in FIG. 5, to measure the tooth surface in the bottom direction, the displacement sensor 12 is rotated counterclockwise at only an extremely small angle $\theta p$ and at the same time is made to travel upward by only $Xp = (Dg/2) \cdot \theta p$ along the X axis. At this time, because the probe 12a is on the standard involute tooth form, the tooth surface is formed according to the standard involute tooth form, provided that the output of the displacement sensor 12 is zero. If any errors exist in the tooth form, the sensor 12 outputs detection signals corresponding to the errors. By repeating such an operation as described above, that is, repeating the $\theta p$ rotation and the $Xp$ linear travel until the probe 12a reaches the tooth bottom, the tooth form of the internal gear 51 is measured on the basis of the detection signals, which are the output of the displacement sensor 12 at measuring points.

As shown in FIGS. 1 to 4, the gear measuring apparatus for measuring the tooth form of the internal gear 51 having a involute tooth without moving the gear according to the present invention comprises detecting means 12 for outputting detection signals corresponding to the tooth form of the gear, an X-direction linear travel system 4 for making the detecting means 12 travel linearly in an X direction perpendicular to a radial line which defines a pressure angle together with a straight line connecting a pitch point on the tooth surface to the center of the gear, and rotation means 3 for rotating the detecting means 12 by causing the X-direction linear travel system 4 to rotate around the rotation center of the gear 51. The gear measuring apparatus according to the present invention further comprises control means 41 for interlocking the rotation means 3 and the X-direction linear travel system 4 so that a probe draws the standard involute tooth form. The control means 41 causes the detecting means 12, which are set to an initial position, to rotate at only an extremely small angle $\theta$ by the rotation means 3, and at the same time the control means 41 causes the detecting means 12 to travel linearly by only $\theta \cdot (Dp \cdot \cos\alpha) \cdot \frac{1}{2}$ with the aid of the X-direction liner travel system 4 in the X direction, which is perpendicular to the radial line. The gear measuring apparatus further comprises recording means 49 for recording the measured results based on detection signals from the detecting means 12 during the measuring operation in which the rotation means 3 and the X-direction linear travel system 4 are interlocked and the interlocking operation is repeated.

The detecting means 12 are so rotated and made to travel linearly by the control means 41 as to draw the standard involute tooth form. During the above motion, the results of the tooth form measured are recorded on the recording means 49 according to the output of the detecting means at the measuring points. The tooth form is thus measured.

The gear measuring apparatus capable of measuring pitches comprises the detecting means 12, the X-axis linear travel system 4, and the Y-axis linear travel system 5, which system causes the detecting means 12 to travel in the Y direction of a radial direction The gear measuring apparatus further comprises the rotation system 3 for rotating the detecting means 12, in response to rotation commands, by rotating the X-axis linear travel system 4 and the Y-axis linear travel system 5 around the rotation center of the gear, and computing means 41 for computing pitch errors. The computing means 41 compute the pitch errors based on the following two types of output: one type of output coming from the detecting means 12, when they are set to an initial position, while the other type of output coming from the detecting means 12, when after the detecting means 12 is made to travel by only x1 and y1 in the X and Y directions, respectively, from the initial position or a measuring position, the detecting means 12 is rotated by one pitch, and then the detecting means 12 is made to travel by only −x1 and −y1, respectively, in order to bring the probe 12a to a measuring position for the next tooth surface.

An apparatus for detecting pitch of the gear 51 without moving the gear 51 may comprise memory means 49 for previously storing amount of deviation between actual positions rotated with a rotation command and the target positions based on the rotation command, at absolute precision measuring points, which are determined previously by dividing one rotation (360°) of the rotation system 3, and control means 41, when the probe 12a is set to a measuring position, for compensating for the deviation of the position of the probe 12a by making the probe 12a travel in the X and Y directions, respectively. The deviation of the probe 12a is based on the differences between an angle position essential for measuring pitches and the absolute precision measuring point, at which the position of the rotation system 3 is indexed. The control means 41 further compensate for the amount of deviation at the absolute precision measuring points, which are read from the memory means 49, by making the probe 12a travel in the X and Y directions, respectively.

Measuring of pitches is performed by the method described below.

The output of the detecting means 12 in the initial position is stored. The probe 12a is withdrawn from the tooth space by making the detecting means 12 travel by only x1 and y1 in the X and Y directions, respectively, from the initial position or the measuring position so that the probe 12a can be rotated by one pitch. Then, the detecting means 12 are made to travel by only −x1 and −y1, respectively, in order to set the probe 12a to a measuring position for the next tooth surface. Pitch errors are computed based on the differences between the output of the detecting means 12 in the measuring position and the stored output of the detecting means 12 when the detecting means 12 were set to the initial position.

The following method of measuring pitches may be provided.

One rotation (360°) of the rotation system 3 is divided into 4,000 equal parts, for example, to determine the absolute precision measuring points. The amount of deviation between the actual position of the rotation system 3, when actually rotated with the rotation command, and a target position calculated by the rotation command are measured and stored beforehand. When the probe 12a is set to the measuring point, angle differences between the angle position essential for measuring pitches and the indexed absolute precision measuring point are then measured, after the position of the rotation means 3 is indexed to the absolute precision measuring point. The travel of the detecting means 12 in the X and Y directions, respectively, compensates for the amount of the deviation of the probe 12a caused by these angle differences. The travel of the detecting means 12 in the X and Y directions, respectively, further compensates for the amount of deviation (size of angle) at the absolute precision measuring points read from the memory means 49.

For the above-described reasons, it is possible to detect pitch errors very accurately.

According to the present invention, it is possible to miniaturize the gear measuring apparatus at a low cost, because the gear to be measured is fixed on the surface plate and the tooth form and pitch thereof are measured by making the gear measuring apparatus travel. The gear measuring apparatus can also measure the pitch of the gear very accurately with low cost, because a table map of a rotational position error between a target position and an actual position of the rotational motor is stored in a memory means.

Other features and advantages of the present invention will become apparent when reference is made to the following Description of the Preferred Embodiment when read with reference to the attached drawings.

BRIEF DESCRIPTION OF THE DRAWINGS

FIG. 1 (b) is a front view of the gear measuring apparatus shown in FIG. 1;

FIG. 2 (b) is an enlarged side view illustrating in detail the swing arm attaching portion;

FIGS. 6A-B is a flowchart showing procedures for measuring tooth forms;

FIGS. 7A-B is a flowchart illustrating procedures for measuring pitches; and

FIG. 8 is a view explaining the pitch measuring principle.

DESCRIPTION OF THE PREFERRED EMBODIMENTS

Figure 1:
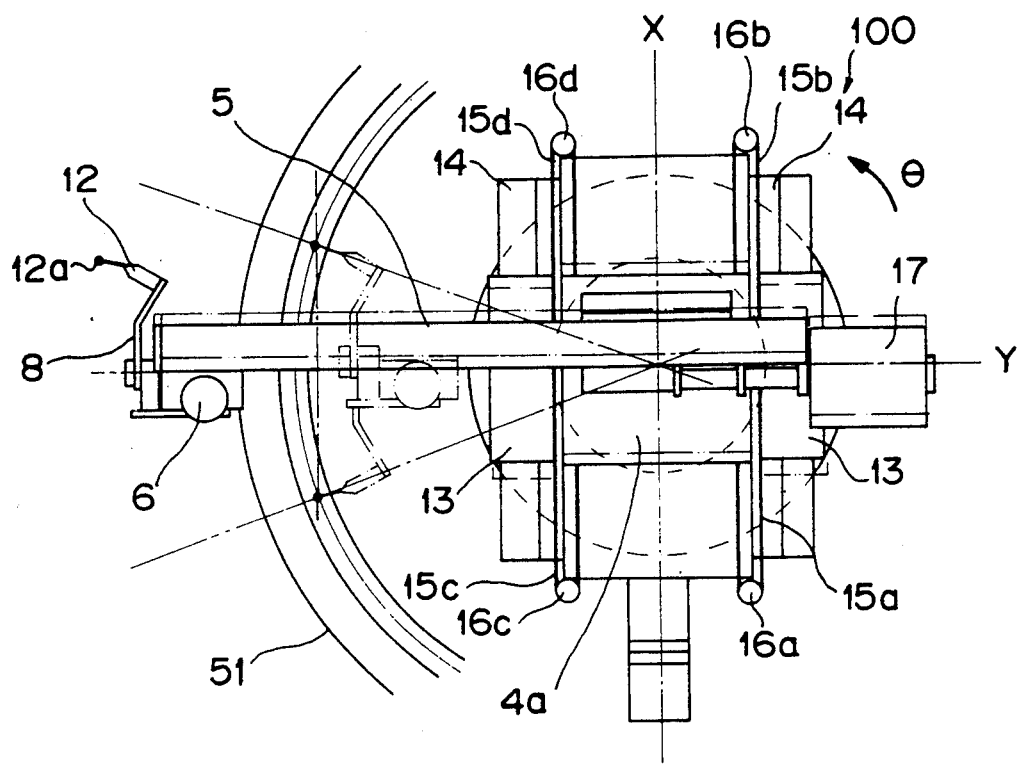
FIG. 1 (a) is a plan view showing the gear measuring apparatus of an embodiment according to the present invention.
Figure 1:
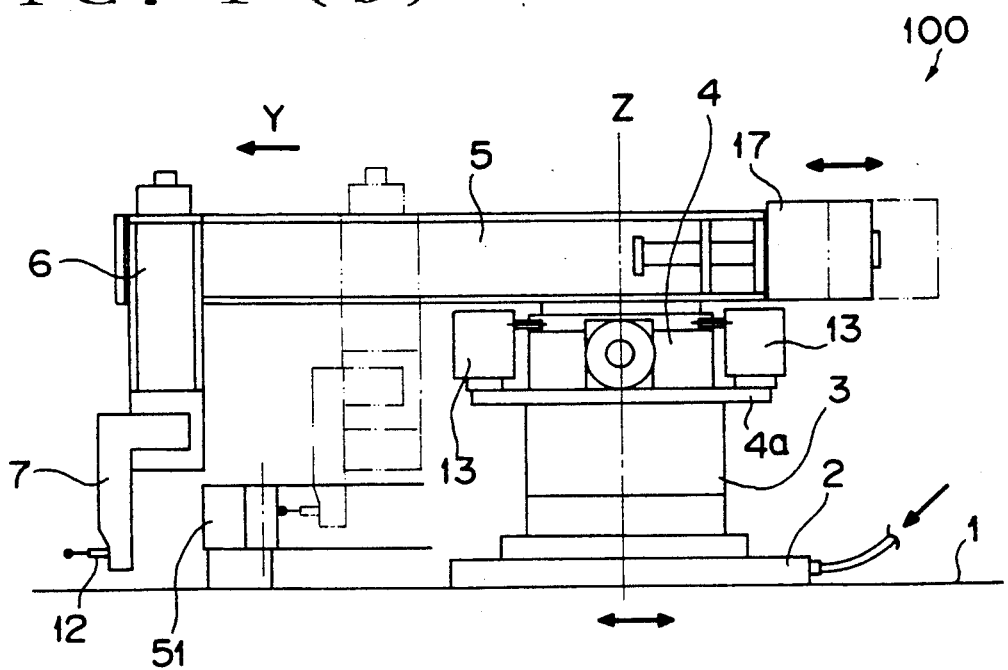

An embodiment of the present invention will be described in detail below with reference to FIGS. 1 to 6. As shown in FIGS. 1 (a) and 1 (b), an apparatus for measuring a gear 100 is so arranged on a surface plate 1 as to slide freely. After a position of the apparatus for measuring the gear 100 is set with respect to the rotation center of an internal spur gear to be measured, which is already fixed on the surface plate 1, measurement is performed.

A turn table 3 stands on a base 2 having a large number of air exhaust nozzles on its under-face. The turn table 3 is rotatable in extremely small angles with the aid of a step motor and so on. An X axis travel system 4 is provided on the turn table 3 and a Y-axis travel system 5 is arranged on an X table 4a of the X-axis travel system 4. The X-axis travel system 4 moves the Y-axis travel system 5 in extremely small increments along the X axis, which runs through the turning center of the turn table 3.

A Z-axis 6 travel system is arranged at the end of the Y-axis travel system 6 and is capable of moving along the Y axis perpendicular to the X axis. The Z-axis travel system moves a swing arm 8 up and down along the Z-axis with the aid of a bracket 7, which is disposed at the lower end the Z-axis travel system 6.

Figure 2:
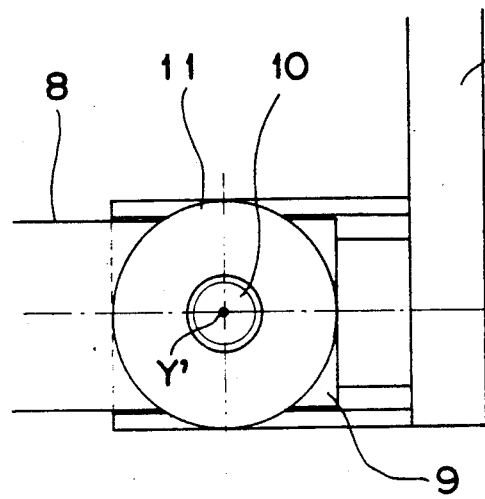
FIG. 2 (a) is an enlarged front view showing in detail a swing arm attaching portion.
Figure 2:
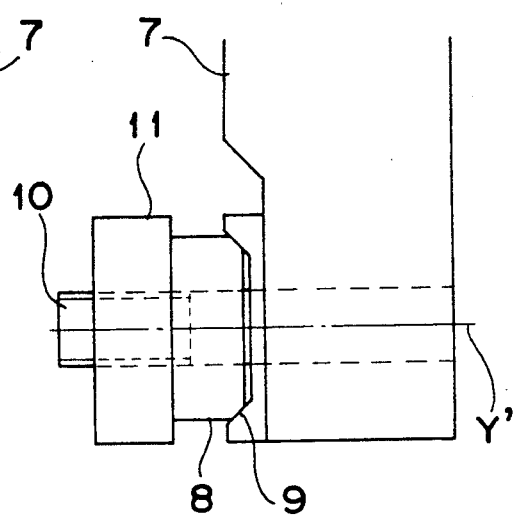

As shown in FIGS. 2 (a) and (b), the swing arm 8 is fitted with a pin 10 running through a V-channel 9, which is fixed to the front of the bracket 7 and is fixed by a nut 11 while contacting the V-channel 9. The axial center of the pin 10 extends in a Y' axial direction running through the turning center of the turn table 3 within the X and Y planes. The swing arm 8 can turn 180° symmetrically with respect to the Y' axis to allow an accurate position of the swing arm 8 by the V-channel 9. The front end of the swing arm 8 is bent in the Y axis direction only to the degree corresponding to a pressure angle $\alpha$ of the tooth form. A displacement sensor 12 called an electrical micrometer is attached to the front end of the swing arm 8. The displacement sensor 12 outputs a detection signal corresponding to the displacement of a probe 12a at the tip of the displacement sensor 12, when the probe 12a is pressed by the tooth surface.

Figure 3:
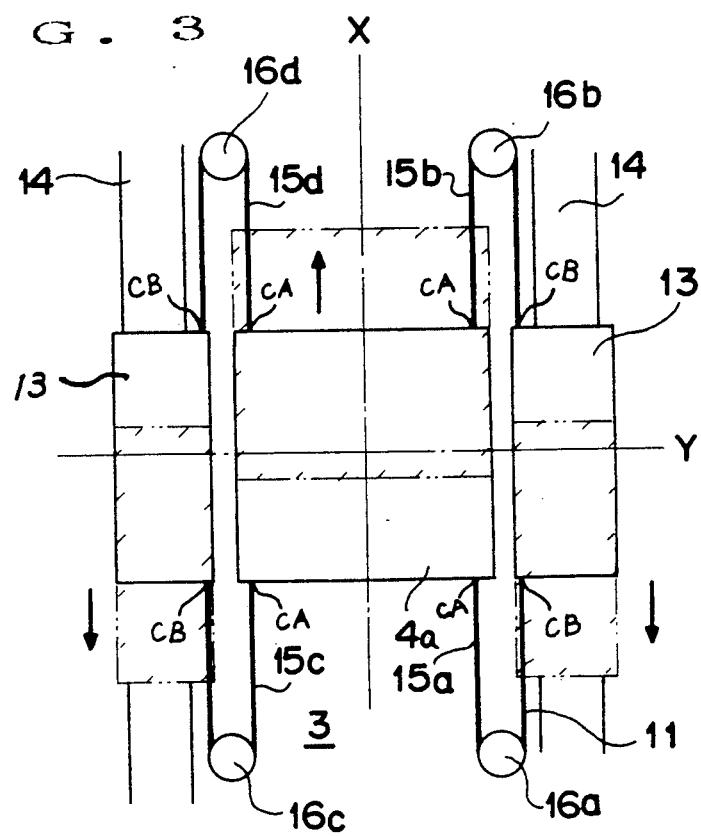
FIG. 3 is an enlarged view showing in detail a balance wight.

Denoted 13 is counterweight to counterbalance various components on the X table 4a. As shown in FIG. 3, the counterweights 13 are so arranged as to slide on rails 14 in the X axis direction. One end CB of each of four cables 15a to 15d is respectively connected to each counterweight 13. The other end CA of each of cables 15a to 15d is so fitted over pulleys 16a to 16d, which are arranged on the turn table 3, as to be attached to the X table 4a. When various components on the X table 4a move in one direction along the X axis, each counterweight 13 moves in the opposite direction the same distance traveled by the various components in order to counterbalance the Y-axis travel system 5 and other components with respect to the Y axis origin.

Numeral 17 in FIG. 1 indicates a counterweight moving along the Y axis to counterbalance the Z-axis travel system 6 and the like. The counterweight 17 is positioned ar the back end of the Y-axis travel system 5 and position thereof is manually adjustable. The counterweight 17 counterbalances the Z-axis travel system 6 and the like with respect to the X axis origin.

Figure 4:
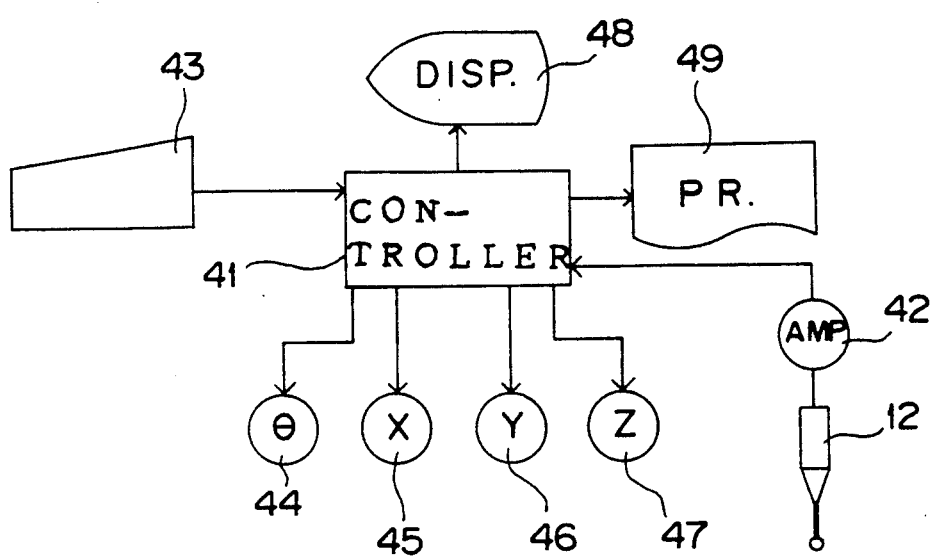
FIG. 4 is a block diagram showing a control system.

FIG. 4 is a block diagram showing a control circuit of the apparatus for measuring the gear.

Signals from the displacement sensor 12 are inputted through an amplifier 42 to a controller 41 and various data and commands from a keyboard 43 are also inputted to the controller 41. A $\theta$ rotation motor 44 for the turn table 3, an X axis motor 45 for the X-axis travel system 4, a Y axis motor for 46 the Y-axis travel system 5 and a Z axis motor 47 for the Z axis travel system 6 are also connected to the controller 41. When the keyboard 43 outputs a command for moving the travel system on the axes, the controller 41 controls each movement of the travel systems. A display 48 and a recorder 49 are further connected to the controller 41 to display or record measurements.

Procedures for measuring the tooth form of an internal gear by using an apparatus for measuring the gear as constructed above will be described with reference to FIG. 5.

The internal gear 51 is fixed on the surface plate 1 so that the rotation center line of the apparatus for measuring the gear 100 coincides with the imaginary rotation center line of the internal gear 51. At this time air is jetted out of the under-face of the base 2 to slide the apparatus for measuring the gear 100 by a slight force, so that adjusting the position of the gear measuring apparatus 100 is easily made. After adjusting the position, with the air stopped from being jetted out, the position of the apparatus 100 is fixed by its dead weight.

The Z-axis travel system 6 then directs the probe 12a to the substantially center position of the gear face width. The X-axis travel system 4 and the Y-axis travel system 5 are so adjusted that the probe 12a of the displacement sensor 12 comes to the initial values of the measurement Xg, Yg as described above, which are determined by a pitch diameter Dp and a pressure angle $\alpha$. The turn table 3 is rotated to bring the probe 12a into contact with a point on the pitch circle of the internal gear 51. In rotating of the turn table 3, the position of the probe 12a is so changed as to direct the displacement sensor 12 to substantially the center of its measurement range. After the position of the probe 12a is set, the value on the display 48 is set to zero. The above-described operation provides an efficient measurement range for the displacement sensor 12.

The keyboard 43 then sends commands to measure the internal gear 51. The measurement commands control the distance traveled by the displacement sensor 12 with the aid of the X axis motor 45 in the X direction and the rotation amount of the displacement sensor 12 by the $\theta$ rotation motor 44 so that the distance traveled corresponds to the rotation amount in the way described below. The commands can be generated by depressing the space key of the keyboard or inputting required commands.

When the tooth form is measured from the pitch point to the tooth bottom, the turn table 3 is rotated counterclockwise by the commands from the keyboard 43 only by an extremely small angle $\theta p$, which has been previously determined, in order to cause the displacement sensor 12 to rotate. At the same time, the X-axis travel system 4 advances the displacement sensor 12 upward as shown in FIG. 5 by only the amount of $(DG/2)\cdot\theta$. By repeating the abovedescribed interlock operation of the rotation and the linear travel through the commands from the keyboard 43, the probe 12 moves, while drawing the standard involute tooth form based on the dimensions of the gear. During the above procedure, when the tooth form is made without any errors, as compared with the standard involute tooth form, the output of the displacement sensor 12 at measuring points is zero, while on the contrary, if some errors exist in the tooth form, the displacement sensor 12 outputs a detection signal proportional to the errors. For these reasons, when the recorder 49 is actuated to correlate the position of the probe 12a on the tooth surface with the output of the probe 12a, the tooth form of the internal gear 51 can be displayed.

Figure 5:
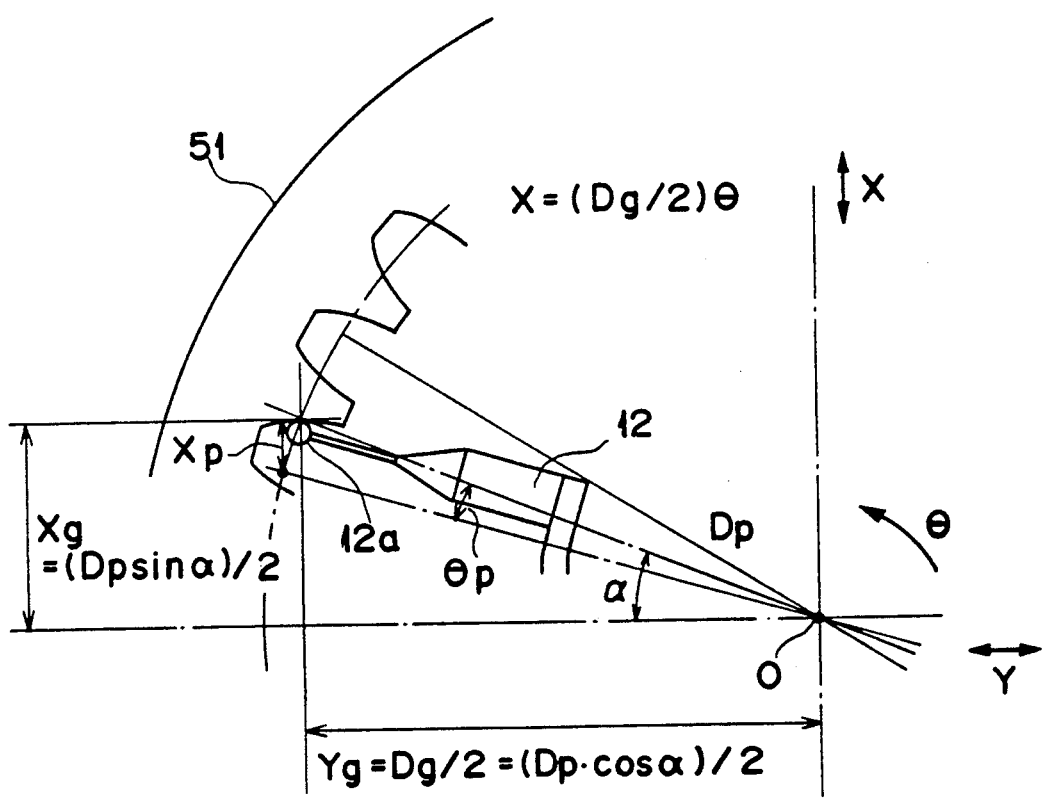
FIG. 5 is a view explaining the measuring theory.

After the measurement to the tooth bottom is completed, the measurement to the tooth tip is started In this measurement, the displacement sensor 12 is rotated clockwise at only an extremely small angle $\theta p$ as shown in FIG. 5 and is moved downward by only an extremely small pitch Xp. This operation is also performed by the commands from the keyboard 43. The detection signals at various measuring points are read and are recorded on the recorder 49 to measure thoroughly the tooth form from the tooth bottom to the tip of the gear.

After the above-described procedure, the nut 11 is loosened to rotate the swing arm 8 at an angle of 180° so that the swing arm 8 is positioned symmetrically in relation to the Y axis of FIG. 5 and then the tooth form of the gear is measured. For the same measuring operation, the probe 12a is then withdrawn from between the two teeth for a while and then the turn table 3 is rotated to insert the probe 12a into a place between another two teeth. By repeating the above-mentioned procedure, the tooth form for the gear teeth can be measured.

Furthermore, when the X-axis travel system 4 moves the displacement sensor 12, together with the Y-axis travel system 5 and the Z-axis travel system 6, the cables 15a-15d move each counterweight 13 in such a way that the counterweight 13 and the X to Z axes travel systems 4 to 6 move in an opposed direction each other with respect to the Y axis in order to counterbalance the Y-axis travel system 5, the Z-axis travel system 6 and other components on the X table 4a. The position of a counterweight 17 is adjusted in accordance with the coordinate position of the probe 12a so that the displacement sensor 12 is counterbalanced in relation to the Y axis. Therefore, the center of gravity of the apparatus for measuring the gear 100 is set substantially at the center of the turn table 3 to measure the gear very accurately without an eccentric load.

Moreover, the swing arm 8 is only rotated 180° at the center of the Y' axis to measure the tooth form of the right and left tooth surfaces, and thus measuring efficiency improves. The position of the swing arm 8, that is, the position of the displacement sensor 12 is substantially determined by bringing the slope defined on the swing arm 8 into contact with the V-channel 9. This eliminates measurement errors in the X axis direction as compared with those in the right and left tooth surfaces every time the displacement sensor 12 travels greatly in the X axis direction. The setting the length of the swing arm 8 in the X axis direction to a value close to the Xg value described above allows the X axis travel system 4 to travel around the center of its travel stroke range. As a result, the travel stroke of the X-axis travel system 4 is minimized, contributing to miniaturizing the gear measuring apparatus.

Since the tooth form is measured by making the measuring apparatus travel, while the gear is fixed on the surface plate, a support structure for the internal gear 51 is unnecessary. For which reason, it is possible to miniaturize the apparatus.

The procedure for performing completely automatically the interlock operation of the $\theta$ rotation and the X axis traveling is briefly described with reference to FIGS. 6A-B.

After the probe 12a of the displacement sensor 12 is set to the initial position (Xg, Yg) and the output of the displacement sensor 12 is set to zero, an automatic tooth form measuring command is inputted from the keyboard 43 to the controller 41 to start a program shown in FIGS. 6A-B. The logical sequence needed for the execution of the program decides in step S1 whether or not the sensor 12 output is zero. If the sensor 12 output is not zero, the sequence goes to step S15 to display "Retry initial set" on the display 48 and terminates there. If the sensor 12 output is zero, the sequence goes down to step S2 to rotate the displacement sensor 12 counterclockwise at an extremely small angle $\theta p$ and at the same time to move the sensor 12 upward along the X axis only by $Xp=(Dp\cdot\cos\alpha/2)\cdot\theta p$. The sequence then goes further down to step S3 to decide whether or not the probe 12 reaches the tooth bottom. If the probe 12 does not reach the tooth bottom yet, the sequence goes back to step S2 to repeat the same logical step as before. If the probe 12 reaches the tooth bottom, the sequence goes down to step S4 for measuring the gear.

In step S4, the displacement sensor 12 is rotated clockwise only at an extremely small angle $\theta p$ and at the same time is moved downward along the X axis only by $Xp=(Dp\cdot\cos\alpha/2)\cdot\theta p$. The logical sequence then goes further down to step S5, where the recorder 49 records the output of the displacement sensor 12. The sequence goes to step S6 to decide whether or not the probe 12a reaches the tooth tip. Then, steps S4 and S5 are repeated until the probe 12 reaches the tooth tip. During these steps, because the probe 12a moves based on the motion described in step 4 on the line drawn by the standard involute tooth form, if the output of the displacement sensor 12 is zero, the tooth surface is formed according to the standard involute tooth form. The sensor 12 would output detection signals corresponding to any errors in the tooth form.

According to the aforesaid procedures, the interlock operation of the $\theta p$ rotation and the Xp linear travel is repeated from the tooth bottom to the tooth tip so that the tooth form of the internal gear 51 can be measured by the detection signals, these signals being measured at various measuring points and being sent from the displacement sensor 12.

In step S6, if it is determined that the probe 12a reaches the tooth tip, the logical sequence goes down to step S7, where the recording is stopped. The sequence then goes further down to step S8, where the $\theta p$ rotation and the Xp linear travel are repeated until the probe 12a comes to a point farther away from the tooth tip. The sequence goes to step S9 to decide whether or not the measuring process is finished. If the process is not finished, the sequence goes further to step S10.

In step S10, the displacement sensor 12 is rotated counterclockwise ($\theta n+1°$). The sequence then goes down to step S11, where the displacement sensor 12 is rotated clockwise at an extremely small angle $\theta p$ and at the same time is moved upward along the X axis by only $Xp=(Dp\cdot\cos\alpha/2)\cdot\theta p$. The procedure described in step S11 is repeated until the probe 12a reaches a pitch point. Then, the logical sequence goes further down to step S12 to decide whether or not the probe 12a has reached the pitch point. If the probe 12a has reached the pitch point, the sequence goes down to step S13 to rotate the displacement sensor 12 further clockwise until the output of the displacement sensor 12 comes to zero. The sequence then goes down to step S14 to decide whether or not the output of the displacement sensor 12 has come to zero. If the output of the displacement sensor 12 has come to zero, the sequence goes back to step S2 to proceed with the same operation as described above for measuring the next tooth surface.

Procedures for detecting pitch errors by using the apparatus for measuring the gear shown in FIGS. 1 to 4 will now be described with reference to FIGS. 7A-B and 8.

Firstly, errors in rotational positions of the $\theta$ rotation motor 44 measured at absolute precision measuring points are tabulated in the following way. For example, if the rotating resolution of the $\theta$ rotation motor 44 is about 1/1,000,000, the position of the motor 44 can be determined by about two-second precision with the command from the controller 41. One rotation (360°) of the $\theta$ rotation motor 44 is divided into 4,000 equal parts (each part being an angle of 0.09°) and 4,000 points determined by theses parts are set to the absolute precision measuring points. A highly accurate angle detector detects actual angle positions at the 4,000 measuring positions, so that differences between command angle positions (target positions) and the actual angle positions are tabulated. To be more specific, for example, when the controller 41 sends a command to rotate the $\theta$ rotation motor 44 by 9°, the rotation angle at which the $\theta$ rotation motor is actually rotated is precisely measured. The difference between the actual measurement (for instance, 9.0015°) and the command angle value (9°) which the controller 41 sends is measured. After the command angle value 9° and the difference 0.015° are correlated with each other, they are stored and tabulated.

Secondly, the probe 12a at the tip of the displacement sensor 12 is set to the initial position Xg, Yg and is brought into contact with the pitch point. At this time, the $\theta$ rotation motor is rotated by a rotation resolution of 1/1,000,000 so that the output of the displacement sensor 12 comes to zero.

Under the above-mentioned conditions, when an automatic pitch measuring command is inputted from the keyboard 43, the controller 41 executes the program whose logical sequence is shown in FIGS. 7A-B.

The sequence decides in step 21 whether or not the output of the displacement sensor 12 is zero. If the output of the displacement sensor 12 is not zero, the sequence goes to step S50 to display "Retry initial set" on the display 48 and terminates there. If the output of the displacement sensor 12 is zero, the position of the $\theta$ rotation motor 44 is indexed at one of the 4,000 in the absolute precision measuring points during the procedures from the steps S22 to S27. The position of the probe 12a, whose contact point with the tooth surface is changed because of the above index operation, is controlled by the X and Y traveling so that the probe 12a is brought into contact with the pitch point in the same relation to the tooth surface as before the index operation.

In other words, the present position $\theta$ s of the $\theta$ rotation motor 44 calculated from the origin is read in step S22. The present position $\theta$ s of the $\theta$ rotation motor 44 can be easily calculated by counting the present number of steps, if the motor 44 is a step motor. Then, the sequence goes to step S23 to determine the absolute precision measuring point position $\theta$ ms closest to the present position $\theta$ s of the $\theta$ rotation motor 44. The absolute precision measuring point position $\theta$ ms is determined by dividing the present position $\theta$ s of the $\theta$ rotation motor 44 by 0.09° (an angle of 1/4,000 of 360°). The sequence goes further down to step S24, where the controller 41 sends a command to rotate the $\theta$ rotation motor 44 counterclockwise, so that the motor 44 is indexed at the position $\theta$ ms. The sequence then goes to step S25 to calculate the deviation $\Delta\theta$ s between the angle position $\theta$ s of the $\theta$ rotation motor 44 when the output of the displacement sensor 12 was initially set to zero and the absolute precision measuring point position $\theta$ ms. The logical sequence goes further down to steps S26 and S27, where the x-axis and Y-axis travel systems 4 and 5 travel the displacement sensor 12 linearly by only $\Delta$xs and $\Delta$ys along the X and Y axes, respectively, to return the position of the probe 12a clockwise by $\Delta\theta$ s. Since the $\Delta\theta$ s is an extremely small value (0.09° or less), the travel distances of the X-axis and Y-axis travel systems are obtained as follows:

$\Delta xs = \Delta\theta s(Dp \cdot \cos\alpha)/2$ $\Delta ys = -\Delta\theta s(Dp \cdot \sin\alpha)/2$ The precision in traveling of the X-axis and Y-axis travel systems is higher than that of $\theta$ rotation, so that the probe 12a of the displacement sensor 12 returns to the original zero position to contact the pitch point.

The aforesaid procedures are capable of indexing the absolute precision measuring point for the $\theta$ rotation motor 44 prior to detecting pitch errors.

The procedure for detecting the pitch errors in practice will now be explained.

In step S28, the output Ss of the displacement sensor 12 is read at this time and stored as an initial value. The initial value Ss is used to calculate actual detection value. In step S29, as described above, the displacement sensor 12 travels in the X and Y directions, respectively, by xl, yl (FIG. 8) to withdraw from a tooth space. In step S30, the motor 44 is rotated to feed a pitch at an angle $\theta$ q (an integral multiple of 0.09°, see FIG. 8) so that the position of the displacement sensor 12 is indexed to come to the absolute precision measuring point. The angle $\theta$q is larger than a rotation angle $\theta$r for one tooth and is closest to the rotational angle $\theta$r. At this time, in step S31, the deviation $\Delta\theta$ rq between the rotation angle $\theta$r for one tooth and the actual rotation angle $\theta$q is calculated. The linear travel of the displacement sensor 12 in the X and Y axis directions counterbalances the deviation $\Delta\theta$ rq in the same way as described above. In step S32, the travel distance of the displacement sensor 12 is obtained as follows:

$\Delta xrq = \Delta\theta rq(Dp \cdot \cos\alpha)/2$ $\Delta yrq = -\Delta\theta rq(Dp \cdot \sin\alpha)/2$ In step S33, the displacement sensor 12 travels in the X and Y directions, respectively.

In step S34, at this time, the deviation $\Delta\theta$ er measured at the absolute precision measuring point is read from the table and is counterbalanced by the linear travel of the displacement sensor 12 in the X and Y directions, respectively. In step S35, the travel distance of the displacement sensor 12 is obtained as follows:

$\Delta xer = \Delta\theta er(Dp \cdot \cos\alpha)/2$ $\Delta yer = -\Delta\theta er(Dp \cdot \sin\alpha)/2$ In step S36, the displacement sensor 12 actually travels.

Further, in step S37, the probe 12a of the displacement sensor 12 travels only by $-$xl and $-$yl to contact the pitch point of the next tooth to be measured. In step S38, the output Si of the displacement sensor 12 at this time is read. The logical sequence of the program needed for executing the pitch measuring goes to step S39 to decide whether the pitch measuring is finished or not. If the pitch measuring is not finished, the above described procedures are repeated until the pitch measuring is finished. If the pitch measuring is finished, the sequence goes to step S40, where a pitch error $\Delta$P is calculated based on the output Si and the initial value Ss, which is previously stored as zero. The sequence then goes further down to step S41, where the error result is displayed or recorded on the display 48 or the recorder 49.

As has been described, according to this embodiment, an expensive motor, used as the $\theta$ rotation motor 44, providing high positioning accuracy, is not necessary. This is because the position of the $\theta$ rotation motor 44 is indexed at the absolute precision measuring point, where angle position errors are previously detected, and then pitch errors are detected. Therefore, an inexpensive pitch detecting apparatus, which permits high accuracy in detecting pitch errors, can be available. Furthermore, when pitch errors are detected, it is also possible to correct the detected results based on the angle position errors determined beforehand. In this case, since the measuring point of the probe 12a deviates greatly from the pitch point, it is necessary to increase the stroke of the probe 12a of the displacement sensor 12. For which reason, it is not desirable from a structural viewpoint that a heavy sensor be attached to the front end of the gear measuring apparatus. When the gear measuring apparatus is constructed in accordance with the present invention, it is possible to measure pitch of the gear at the pitch point where the measuring point of the probe 12a is positioned and to employ a lightweight sensor with a short stroke of the probe 12a, thereby improving measuring accuracy.

In the same method as has been described above, it is also possible to measure the tooth form of a helical gear by using a rotation plane module Ms and a rotation plane pressure angle $\Delta s$ expressed in the formulae below.

$$Ms = \frac{M}{\cos\beta}$$

$$\alpha s = \arctan\left(\frac{\tan\alpha}{\cos\beta}\right)$$

where, M is a normal module, $\alpha$ is a normal pressure angle and $\beta$ is a helix angle.

Although a contact displacement sensor with an electric micrometer is used in this embodiment, contact sensors of other types as well as optical non-contact sensors may also be utilized. This embodiment has been described specifically for the measuring apparatus for internal gears, however, the apparatus may also be used for measuring external gears, if the displacement sensor is so directed to the rotation center of the gear as to contact the tooth surface.

What is claimed is:

1. A gear measuring apparatus for measuring the tooth form of a gear having a involute tooth without moving the gear, said apparatus comprising:
   detecting means, including a probe, for outputting detection signals corresponding to the tooth form of said gear;
   an X-direction linear travel system for making said detecting means travel linearly in an X direction perpendicular to a radial line which defines a pressure angle together with a straight line connecting a pitch point on the tooth surface to the center of said gear;
   rotation means for rotating said detecting means by causing said X-direction linear travel system to rotate around the rotation center of said gear;
   control means for interlocking said rotation means and said X-direction linear travel system so that said probe draws the standard involute tooth form, said control means rotating said detecting means, which are set to an initial position, at substantially only an extremely small angle $\theta$ by said rotation means, and at the same time said control means causing said detecting means to travel linearly by substantially only $\theta \cdot (Dp \cdot \cos\alpha) \cdot \frac{1}{2}$ (Dp is a pitch diameter and $\alpha$ is a pressure angle of the gear) with the aid of said X direction liner travel system in said X direction, which is perpendicular to said radial line; and
   recording means for recording the measured results based on detection signals from said detecting means during the measuring operation in which said rotation means and said X-direction linear travel system are interlocked and said interlocking operation is repeated.

2. A gear measuring apparatus according to claim 1, wherein said apparatus includes an air table and the abovedescribed components are arranged on said air table.

3. A gear measuring apparatus according to claim 1, wherein said apparatus further comprises a Y direction linear travel system to make said detecting means travel in said radial line direction.

4. A gear measuring apparatus according to claim 1, wherein said X-direction linear travel system includes an X table supporting said detecting means and drive means for driving said X table in said X direction, and said apparatus further includes a counter balance system, which makes a counterweight travel across said radial line in the opposite direction of said X table so that the center of gravity of said X table and members supported thereon always comes to said radial line.

5. A gear measuring apparatus according to claim 2, wherein said X-direction linear travel system includes an X table supporting said detecting means and drive means for driving said X table in said X direction, and said apparatus further includes a counter balance system, which makes a counterweight travel across said radial line in the opposite direction of said X table so that the center of gravity of said X table and members supported thereon always comes to said radial line.

6. A gear measuring apparatus according to claim 1, wherein said detecting means are so attached as to be capable of reversing 180° symmetrically to said radial line.

7. A gear measuring apparatus according to claim 2, wherein said detecting means are so attached as to be capable of reversing 180° symmetrically to said radial line.

8. A gear measuring apparatus according to claim 3, wherein said detecting means are so attached as to be capable of reversing 180° symmetrically to said radial line.

9. An apparatus for detecting pitch of a gear without moving said gear, said apparatus comprising:
   detecting means, including a probe, for outputting detection signals corresponding to the tooth form of said gear;
   an X-direction linear travel system for making said detecting means travel linearly in an X direction perpendicular to a radial line which defines a pressure angle together with a straight line connecting a pitch point on the tooth to the center of said gear;
   a Y-direction linear travel system for making said detecting means travel linearly in a Y direction of said radial line;
   rotation means for rotating said detecting means by causing, in response to a rotation command, the linear travel systems to rotate around the rotation center of said gear; and
   computing means for computing pitch errors based on the following two types of output: one type of output coming from said detecting means, when they are set to an initial position, while the other type of output coming from said detecting means, when after said detecting means is made to travel by substantially only x1 and y1 in said X and Y directions, respectively, from the initial position or a measuring position, said detecting means is rotated by one pitch, and then said detecting means are made to travel by substantially only −x1 and −y1, respectively, in order to bring said probe to the measuring position for the next tooth surface.

10. A gear measuring apparatus according to claim 9, wherein said apparatus comprises:

memory means for previously storing the amount of deviation between actual positions rotated with a rotation command and target positions based on the rotation command, at absolute precision measuring points, which are determined previously by dividing one 360° -rotation of said rotation system; and control means, when said probe is set to a measuring position, for compensating for the deviation of the position of said probe by making said probe travel in said X and Y directions, respectively, the deviation of said probe being based on the differences between an angle position essential for measuring pitches and said absolute precision measuring point at which the position of said rotation system is indexed, said control means further compensating for the amount of deviation at said absolute precision measuring points, which are read from said memory means, by making said probe travel in said X and Y directions, respectively.

11. A gear measuring apparatus according to claim 10, wherein said control means comprises:

initial position setting means for resetting said probe to said initial position in such a way that said rotation system is rotated at a calculated absolute precision measuring point, which is close to the actual position of said rotation means at which said probe is set to the initial position in relation to the standard tooth surface at the start of measuring, and then said detecting means are made to travel linearly, based on the amount of the deviation $\Delta\theta s$ between this calculated absolute precision measuring point and the actual position of said rotation means, by substantially only $\Delta\theta s\ (D_p \cdot \cos\alpha) \cdot \frac{1}{2}$ and $-\Delta\theta s\ (D_p \cdot \sin\alpha) \cdot \frac{1}{2}$ with the aid of said X-direction linear travel system and said Y-direction linear travel system in said X and Y directions, respectively; and measuring position setting means for setting said detecting means to the measuring position for the next tooth surface in such a way that (i) after said detecting means to be set at the initial position or measuring position is moved by substantially only x1 and y1 in said X and Y directions, respectively and then said detecting means is rotated to one of the absolute precision measuring points which is beyond and close to a point at which the detecting means would be rotated by one pitch of the gear from the initial position or measuring position, the deviation $\neq \theta pq$ is calculated as differences between the actual rotational angle and the rotational angle for one pitch of the gear, so that said detecting means is moved in the X axis direction by substantially only $\Delta\theta pq \cdot (D_p \cdot \cos\alpha) \cdot \frac{1}{2}$ with the aid of said X-direction linear travel system and in the Y axis direction by substantially only $\Delta\theta pq \cdot (D_p \cdot \sin\alpha) \cdot \frac{1}{2}$ based on deviation $\Delta\theta pq$, and (ii) at the same time, said detecting means is made to travel linearly, based on the amount of deviation $\Delta\theta er$ read from said memory means, by substantially only $\Delta\theta er\ (D_p \cdot \cos\alpha) \cdot \frac{1}{2}$ and $-\Delta\theta er (D_p \cdot \sin\alpha) \cdot \frac{1}{2}$ with the aid of said X-direction linear travel system and said Y-direction linear travel system in said X and Y directions, respectively, and is made to travel by substantially only −x1 and −y1, in said X and Y directions, respectively.

12. A gear measuring apparatus according to claim 9, wherein said apparatus includes an air table and the abovedescribed components are arranged on said air table.

13. A gear measuring apparatus according to claim 10, wherein said apparatus includes an air table and the abovedescribed components are arranged on said air table.

14. A gear measuring apparatus according to claim 11, wherein said apparatus includes an air table and the abovedescribed components are arranged on said air table.

15. A gear measuring apparatus according to claim 9, wherein said X-direction linear travel system includes an X table supporting said detecting means and drive means for driving said X table in said X direction perpendicular to said radial line, and said apparatus further includes a counter balance system, which makes a counterweight travel across said radial line in the opposite direction of said X table so that the center of gravity of said X table and members supported thereon always comes to said radial line.

16. A gear measuring apparatus according to claim 10, wherein said X direction linear travel system includes an X table supporting said detecting means and drive means for driving said X table in said X direction perpendicular to said radial line, and said apparatus further includes a counter balance system, which makes a counterweight travel across said radial line in the opposite direction of said X table so that the center of gravity of said X table and members supported thereon always comes to said radial line.

17. A gear measuring apparatus according to claim 11, wherein said X-direction linear travel system includes an X table supporting said detecting means and drive means for driving said X table in said X direction perpendicular to said radial line, and said apparatus further includes a counter balance system, which makes a counterweight travel across said radial line in the opposite direction of said X table so that the center of gravity of said X table and members supported thereon always comes to said radial line.

* * * * *